United States Patent [19]

Fischer

[11] 4,204,597

[45] May 27, 1980

[54] CONTAINER AND SOLDERING KIT

[75] Inventor: Jerome A. Fischer, Franklin, Wis.

[73] Assignee: Lucas-Milhaupt, Inc., Cudahy, Wis.

[21] Appl. No.: 39,663

[22] Filed: May 16, 1979

[51] Int. Cl.² .................... A45C 11/00; B65D 51/24; B65D 85/04

[52] U.S. Cl. .................... 206/216; 206/223; 206/229; 206/503; 220/20

[58] Field of Search ............... 206/223, 226, 229, 217, 206/216, 389, 45.31, 45.14, 45.19, 503, 493; 220/20, 355, 23.83

[56] References Cited

U.S. PATENT DOCUMENTS

| | | | |
|---|---|---|---|
| 1,366,278 | 1/1921 | Recker | 206/229 |
| 2,003,102 | 5/1935 | Baer | 206/217 |
| 2,033,349 | 3/1936 | Miller | 206/45.31 |
| 2,157,255 | 5/1939 | Bumpass | 206/216 |
| 2,217,644 | 10/1940 | Conner | 220/20 |
| 2,339,475 | 1/1944 | Hartsell et al. | 206/226 |
| 2,563,157 | 8/1951 | Castelli | 206/45.14 |
| 2,681,731 | 6/1954 | Chambers | 206/226 |
| 2,695,115 | 11/1954 | Roop | 220/355 |

Primary Examiner—William T. Dixson, Jr.
Attorney, Agent, or Firm—James E. Nilles

[57] ABSTRACT

A container for housing related articles and materials, such as a coil of solder wire, soldering flux and a flux application brush, facilitates merchandising, use and storage of the articles and materials therein. The container comprises a base member and a removable outer cover. The base member comprises a flat circular base plate having a hollow cylindrical projection on one side thereof on which the coil is placed and within the hollow recess thereof flux is stored. In one embodiment, the flux is contained in the hollow projection itself and an inner removable cap is provided to close off the open end of the projection. In another embodiment the flux is contained in a small capped jar which is disposed in the recess. The projection includes an open-ended storage compartment extending transversely thereinto in which the brush is stored. In the said one embodiment, the storage compartment is separated by a wall from the recess containing the flux. In the said other embodiment, the jar in the recess serves to separate the flux from the storage compartment. The removable outer cover and edge of the base plate includes interengageable releasable locking members and the cover, when in place, encloses the projection, the coil thereon, and the storage compartment passage and brush therein. The outer cover includes a central opening in registry with the inner cap or jar cover to facilitate detachment of the outer cover base and to enable viewing of indification indicia on the inner cap or jar cover.

19 Claims, 8 Drawing Figures

CONTAINER AND SOLDERING KIT

FIELD OF USE

This invention relates generally to containers for housing a variety of related articles or materials and which facilitate merchandising, use and storage of the articles or materials. In particular, it relates to a container for housing a coil of solder wire, paste or liquid type soldering flux and a flux application brush to thereby provide a soldering kit.

DESCRIPTION OF THE PRIOR ART

The prior art teaches a wide variety of containers designed to house a variety of related articles or materials and to thereby facilitate the merchandising, use and storage of such articles or materials. Such containers are used in connection with cosmetics, pharmaceutical and first-aid supplies, sewing materials, fishing gear, hardware items, and so forth. U.S. Pat. Nos. 3,049,227 and 2,681,731 exemplify the prior art.

Presently, coils of solder wire, liquid and paste type soldering fluxes for use therewith, and small flux brushes are usually packaged and sold as separate items. The purchaser-user, therefore, needs to correctly select compatible types of solders and fluxes (pastes or liquids) for a particular job and needs to obtain or provide a brush or other instrument for application of the flux. After use, the articles and materials are usually stored separately and can easily be misplaced.

SUMMARY OF THE PRESENT INVENTION

In accordance with the present invention there is provided an improved container for housing a variety of related articles or materials and which facilitates the merchandising, use and storage thereof. The improved container is particularly well-suited for housing articles and materials used in soldering, such as a coil of solder wire, paste or liquid type soldering flux, and a flux application brush, but could be used for other articles and materials.

The improved container generally comprises a base member and a removable outer cover member. The base member comprises a flat circular base plate having a hollow cylindrical open-ended projection integrally formed on one side. The projection is adapted to receive a coil, such as solder wire, therearound and contains a recess therein in which the flux, either in bulk form or bottled, is contained. The projection includes an open-ended storage compartment extending transversely thereinto for storage of an object, such as the flux application brush. The storage compartment is separated by a wall from the recess containing bulk flux or, is not separated from the recess in another embodiment. In one embodiment a removable inner cap is provided to close the open end of the recess in the hollow projection and seal the flux therein. In another embodiment a small capped jar or bottle is disposed in the recess to contain the flux. The removable outer cover, which overlies the inner cap or jar cover and surrounds the projection and coil thereon, is releasably connected to the base by interengageable releasable locking means provided on the base and outer cover. The outer cover includes a centrally located opening in registry with the jar cap or projection cap to facilitate detachment of the base member and outer cover member and to provide a view of the jar cap or projection cap which may be color-coded or bear indicia indicative of the type or style of kit. Stacking means are provided on the bottom of the base members and on the top of the cover to facilitate the stacking of several similar containers.

A container and kit in accordance with the invention offer several advantages over the prior art. For example, there is assurance that properly related articles and materials, such as solder, flux and brush are purchased and employed. The container is designed to facilitate its stackability with other similar containers thereby conserving shelf space in the store and shop. Use of a cover opening for viewing indicia on the cap therebeneath enables the same type of container to be used with different types or styles of related materials, thereby reducing manufacturing costs. The container, which is simple and compact and conservative of storage space, is relatively economical to fabricate and efficient to use. Other objects and advantages will hereinafter appear.

THE DRAWINGS

DESCRIPTION OF PREFERRED EMBODIMENTS

Figure 1:
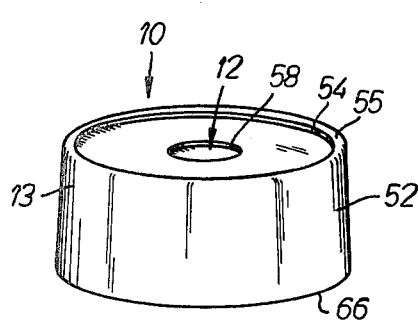
FIG. 1 is a perspective view of the top side of the container made in accordance with the present invention.
Figure 2:
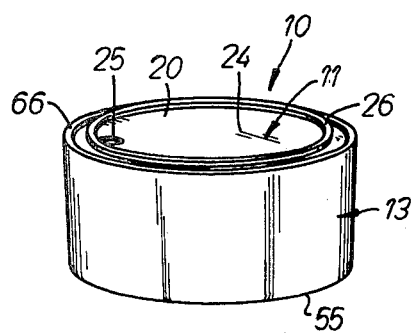
FIG. 2 is a perspective view of the bottom side of the container shown in FIG. 1.
Figure 3:
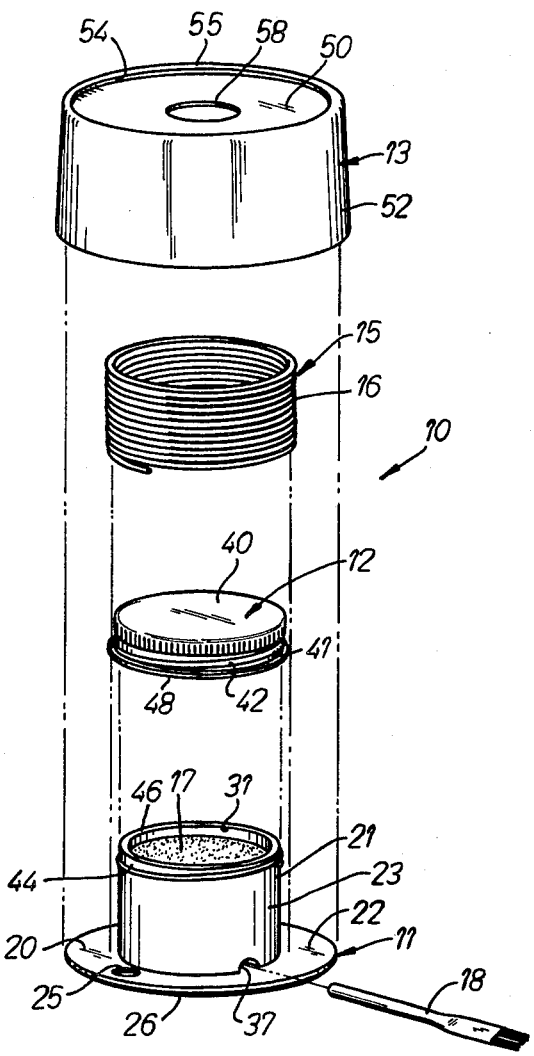
FIG. 3 is an exploded perspective view of the container shown in FIGS. 1 and 2.

Referring to FIGS. 1, 2 and 3, the numeral 10 designates a container for a solder kit in accordance with the invention. FIGS. 1 and 2 show container 10 in closed condition and FIG. 3 shows that the container comprises a base member 11, a detachable inner cover member or cap 12 and a detachable outer cover member 13. The members 11, 12 and 13 may be fabricated of any suitable material, such as glass, plastic or metal, but plastic is preferred, because of ease of fabrication and corrosion resistance. FIG. 3 also shows container 10 as part of a kit containing related useable materials, such as a coil 15 of a wire type or filament type solder 16, soldering flux 17 in the form of a paste, and a brush 18 for application of the flux to a workpiece (not shown) to be soldered.

As FIGS. 2, 3, 5 and 6 best show, base member 11 comprises a generally flat circular base plate 20 and an integrally formed hollow cylindrical projection 21 extending from the top surface 22 of base plate 20. The outer surface 23 of projection 21 defines a member on which the solder 16 is wound to form coil 15 or on which a preformed coil 15 is placed. The inner surface 25 of projection 21 and a portion 30 of base plate 20 cooperate to define a recess 31 in which the paste flux 17 is disposed.

The projection 21 is provided with a passage or storage compartment 33 which extends transversely therethrough between opposite sides of outer surface 23 of the projection. Passage 33 is adapted to receive brush 18 which is removably stored therein. Passage 33 is defined by a portion 35 of base plate 20 and by a semi-cylindrical member 36 which is integrally connected to base plate 20 and projection 21 and is thus physically separated from recess 31. Access to passage 33 is through either of the holes 37 on opposite sides of projection 21. The bottom surface 24 of base plate 20 is provided with an integrally formed outwardly extending annular stacking ring 26. Base plate 20 also includes a hole 25 therethrough through which the solder wire 16 can extend. Hole 25 is also usable to hang the kit for display or storage.

The open end of projection 21 is closeable by means of detachable inner cover member or cap 12. Cap 12 comprises a flat circular portion 40 and an integrally formed flange 41 which is provided with a female screw thread 42 which threadedly engages a male screw thread 44 integrally formed on the outer surface 23 of projection 21. A gasket or sealing ring 45 is disposed between portion 40 of cap 12 and the end edge 46 of projection 21 to prevent leakage of flux 17 from recess 31.

The flange 41 of cap 12 is provided with a lip 48 which, if large enough, can aid in retaining coil 15 in place on the spool when the cap 12 is in place, but outer cover 13 removed.

The detachable outer cover member 13, which when in place overlies cap 12, surrounds the coil 15 and prevents loss of the brush 18 from passage 33, comprises a generally flat circular portion 50 and an integrally formed slightly tapered but generally cylindrical side portion 52. Circular portion 50 is provided with an indentation or stacking recess 54 which defines an outer ring 55 and is of slightly larger diamter than stacking ring 26 on base plate 20 to enable two such containers as 10 to be stacked one atop the other in a slip-resistant relationship.

The inner side 60 of circular portion 50 bears against cap 12 when outer cover member 13 is attached to base member 11. Portion 50 is provided with a central opening 58 which is in registration with cap 12 and which serves two purposes. First, opening 58 enables the user of container 10 to exert finger pressure directly against cap 12 to thereby effect detachment of outer cover member 13 from base member 11. Second, opening 58 enables visual inspection of any indicia, label or color coding on cap 12 indicative of the type or model number of the kit while the kit is still closed.

Figure 7:
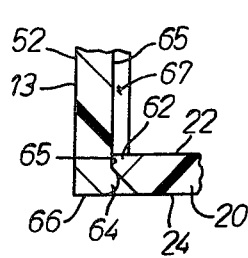
FIG. 7 is an enlarged cross-sectional view of a portion of the cover-base attachment means shown in FIG. 6.
Figure 6:
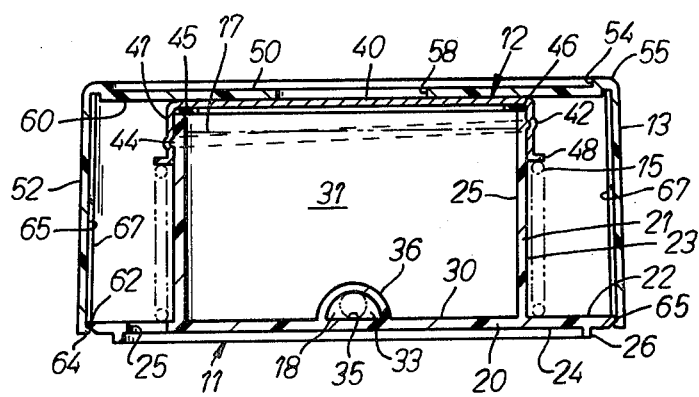
FIG. 6 is a cross-sectional view taken on line 6—6 of FIG. 5.
Figure 4:
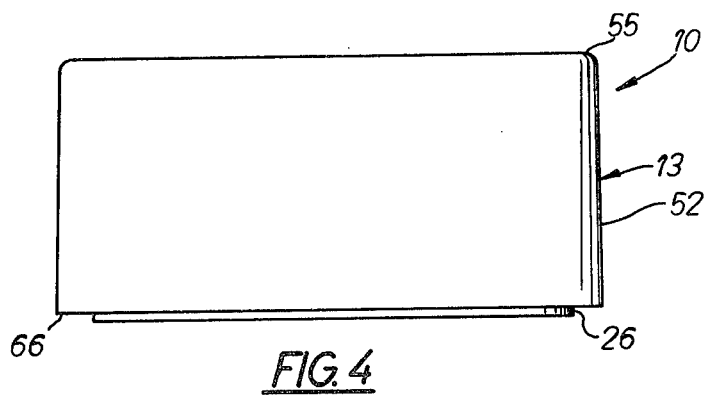
FIG. 4 is a side elevational view of the container.

As FIGS. 6 and 7 best show, means are provided to detachably connect outer cover member 13 to base member 11 and such means comprise a chamfered or bevelled edge 62 of sloped cross section formed at the outer peripheral or circumferential edge 63 of base plate 20. Edge 62 is releasably engageable with an annular projection 64 of semi-circular cross section formed on the inside surface 65 of cylindrical side portion 52 of outer cover member 13. Preferably, projection 64 is formed as close as possible to the end edge 66 of member 13. The bottom surface 24 of base plate 20 and the edge 66 of cover member 13 are flush to facilitate stacking. Four stop members 67 are integrally formed on inside surface 65 of cover 13 and cooperate with projection 64 to define slots 65 which limit inward movement between cover 13 and base plate 20.

During manufacture and assembly of the kit, the recess 31 is filled with flux 17, the inner cover member cap 12 is put in place on the spool, the brush 18 is inserted in passage 33, the coil 15 is disposed on the spool, and the outer cover member 13 is put in place and attached to the base member 11. The kit is then ready for merchandising. In use, outer cover member 13 is removed, making use of opening 58, thereby making coil 15 and brush 18 accessible. Inner cap 12 is then removed making the flux 17 accessible. Coil 15 is removable for use or, if preferred, it may be left on the spool and a length of solder 16 merely withdrawn and the base member 11 with coil 15 thereon may be handheld during soldering.

Figure 8:
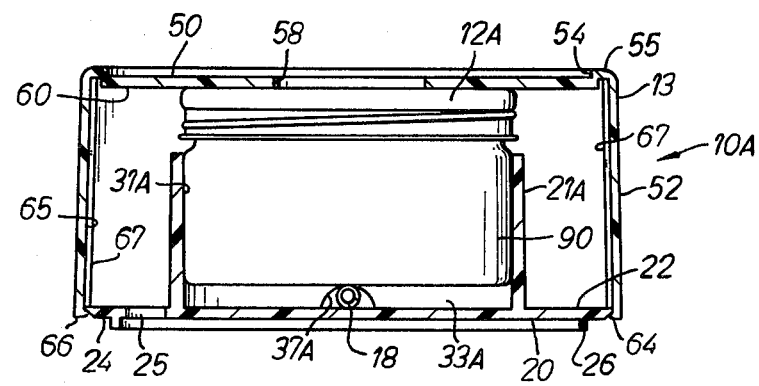
FIG. 8 is a cross-sectional view of another embodiment of this invention.
Figure 5:
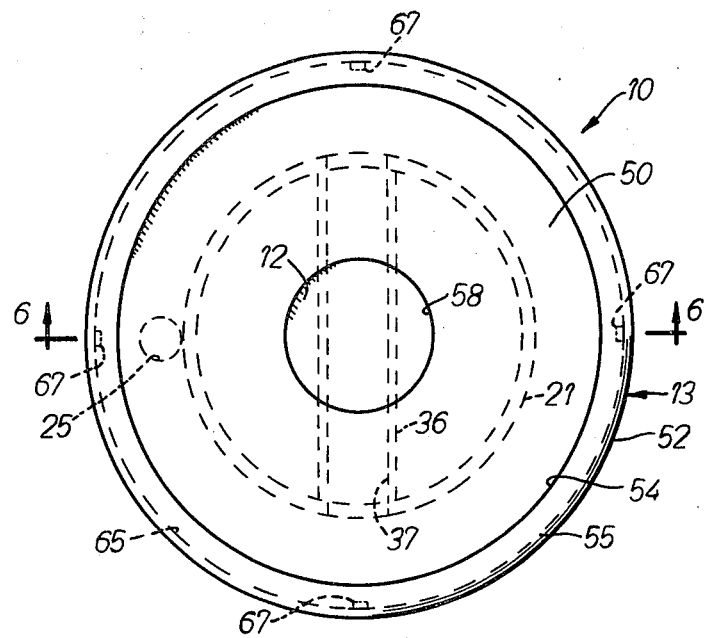
FIG. 5 is a top plan view of the container.

Referring to FIG. 8, there is shown another embodiment of the invention which is similar to that hereinbefore described, except as hereinafter explained. The container 10A of FIG. 8 comprises an outer cover 13 and a base member 11A in which the recess 31A in projection 21A is adapted to receive a small jar or bottle 90 which is provided with its own cap 12A and which is removable from recess 31A. Jar 90 contains flux 17 in either paste or liquid form. Projection 21A is provided on opposite sides thereof with holes 37A which afford access to a space 33A below jar 90, which space 33A serves as a storage compartment for brush 18. Space 33A is connected to or is a part of the recess 31A and the jar 90 serves as the separating means between the flux 17 and storage compartment 33A. The cap 12A of jar 90 is located in the same relationship to the hole 58 in outer cover 13 as the inner cap 12 is in container 10. Thus, container 10A is opened and closed in the same manner as container 10.

In the embodiments show, the kit includes a coil 15 of solder, flux 17, and a brush 18. However, the projection 21 is adapted to receive other types of coiled materials, such as thread or fishing line, and the recess 31 could be employed to hold other related materials, besides flux 17, such as glue or waterproofing silicone paste. Similarly, storage passage 33 could hold other objects related to fishing or sewing or some other art or craft. Although solder wire and solder flux are disclosed, it is apparent that braze wire and brazing flux could be employed in the kit.

I claim:
1. In a container:
   a base member including a base plate and a projection extending from one side of said base plate, said projection including a recess therein accessible through an opening in the end of said projection;
   means removably supported on said projection and serving to close said opening at the end of said projection;
   an outer cover releasably connectable to said base plate and surrounding said projection and said means, said outer cover bearing against said means and having an opening therethrough in registry with said means;
   and releasably engageable locking means on said outer cover and said base plate for securing said outer cover to said base member.

2. A container according to claim 1 wherein said means comprises a cap member attached directly to said projection.

3. A container according to claim 1 wherein said means comprises a jar attached to said projection and a cap for said jar.

4. In a container:
   a base member including a base plate and a projection extending from one side of said base plate, said projection including a recess therein accessible through an opening in the end of said projection,
a cap releasably connected to said projection for closing said opening in the end of said projection;
an outer cover releasably connectable to said base plate and surrounding said projection and said cap
said outer cover bearing against said cap and having an opening therethrough in registry with said cap;
and releasably engageable locking means on said outer cover and on said base plate for securing said outer cover to said base member.

5. A container according to claim 4 including stacking means formed on the outside of said outer cover and on the other side of said base plate.

6. In a container:
a base member including a base plate and a projection extending from one side of said base plate,
said projection including a recess therein accessible through an opening in the end of said projection,
a jar including a removable cap and releasably supported in said recess;
an outer cover releasably connectable to said base plate and surrounding said projection and said jar therein;
said outer cover bearing against said cap on said jar and having an opening therethrough in registry with said cap;
and releasably engageable locking means on said outer cover and on said base plate for securing said outer cover to said base member.

7. A container according to claim 6 including stacking means formed on the outside of said outer cover and on the other side of said base plate.

8. In a container:
a base member including a base plate and a projection extending from one side of said base plate, said projection including a recess therein accessible through an opening in the end of said projection; said projection further including a storage compartment therein accessible through an opening in the side of said projection;
means removably supported on said projection and serving to close said opening at the end of said projection;
an outer cover releasably connectable to said base plate and surrounding said projection and said means, said outer cover bearing against said means and having an opening therethrough in registry with said means;
and releasably engageable locking means on said outer cover and said base plate for securing said outer cover to said base member.

9. A container according to claim 8 wherein said means comprises a cap member attached directly to said projection.

10. A container according to claim 8 wherein said means comprises a jar attached to said projection and a cap for said jar.

11. A container according to claim 8 wherein said base member includes means for physically separating said recess from said storage compartment.

12. A container according to claim 8 wherein said means operates to physically separate said recess from said storage compartment.

13. In a container:
a base member including a base plate and a projection extending from one side of said base plate,
said projection including a recess therein accessible through an opening in the end of said projection,
said projection further including a storage compartment therein accessible through an opening in the side of said projection;
wall means on said base member for physically separating said recess and said storage compartment;
a cap releasably connected to said projection for closing said opening in the end of said projection;
an outer cover releasably connectable to said base plate and surrounding said projection and said cap,
said outer cover bearing against said cap and having an opening therethrough in registry with said cap;
and releasably engageable locking means on said outer cover and on said base plate for securing said outer cover to said base member.

14. A container according to claim 13 including stacking means formed on the outside of said outer cover and on the other side of said base plate.

15. In a container:
a base member including a circular base plate and a cylindrical projection extending from one side of said base plate,
said projection including a recess therein accessible through an opening in the end of said projection,
said projection further including a storage compartment therein accessible through openings in opposite sides of said projection;
wall means on said base member and within said recess for physically separating said recess and said storage compartment;
a cap releasably connected to said projection for closing said opening in the end of said projection;
an outer cover releasably connectable to said base plate and surrounding said projection and said cap,
said outer cover including a flat circular top portion bearing against said cap and having an opening through in registry with said cap, said outer cover further including a generally cylindrical side portion;
and releasably engageable locking means on said cylindrical portion of said outer cover and near the peripheral edge of said circular base plate for securing said outer cover to said base member.

16. A container according to claim 15 including a stacking ring formed on said top portion of said cover and a stacking ring formed on the other side of said circular base plate.

17. In a container:
a base member including a base plate and a projection extending from one side of said base plate,
said projection including a recess therein accessible through an opening in the end of said projection,
said projection further including a storage compartment therein accessible through an opening in the side of said projection;
a jar including a removable cap and releasably supported in said recess above said storage compartment;
an outer cover releasably connectable to said base plate and surrounding said projection and said jar therein;
said outer cover bearing against said cap on said jar and having an opening therethrough in registry with said cap;
and releasably engageable locking means on said outer cover and on said base plate for securing said outer cover to said base member.

18. In a container:

a base member including a circular base plate and a cylindrical projection extending from one side of said base plate, said projection including a recess therein accessible through an opening in the end of said projection, said projection further including a storage compartment therein accessible through openings in opposite sides of said projection;

a jar including a removable cap and releasably supported in said recess above said storage compartment;

an outer cover releasably connectable to said base plate and surrounding said projection and said jar therein;

said outer cover including a flat circular top portion bearing against said cap on said jar and having an opening through said top portion in registry with said cap, said outer cover further including a generally cylindrical side portion;

and releasably engageable locking means on said cylindrical portion of said outer cover and near the peripheral edge of said circular base plate for securing said outer cover to said base member.

19. A container according to claim 18 including a stacking ring formed on said top portion of said cover and a stacking ring formed on the other side of said circular base plate.